United States Patent [19]

Nishimura et al.

[11] Patent Number: 4,974,472
[45] Date of Patent: Dec. 4, 1990

[54] HYDRAULIC POWER TRANSMISSION APPARATUS

[75] Inventors: Sadanori Nishimura; Horishige Makita, both of Saitama, Japan

[73] Assignee: Honda Giken Kogyo Kabushiki Kaisha, Tokyo, Japan

[21] Appl. No.: 425,362

[22] Filed: Oct. 19, 1989

Related U.S. Application Data

[63] Continuation of Ser. No. 155,996, Feb. 16, 1988, abandoned.

[30] Foreign Application Priority Data

| May 29, 1987 | [JP] | Japan | 62-134195 |
| May 29, 1987 | [JP] | Japan | 62-134193 |
| May 29, 1987 | [JP] | Japan | 62-134194 |
| Feb. 13, 1988 | [JP] | Japan | 63-31128 |

[51] Int. Cl.$^5$ ............................................. F16H 47/02
[52] U.S. Cl. ............................................. 74/718; 74/720
[58] Field of Search ............... 74/687, 677, 718, 720, 74/665 F, 665 G, 606 R; 60/488, 490, 492; 180/307, 308; 475/72

[56] References Cited

U.S. PATENT DOCUMENTS

| 3,074,296 | 1/1963 | Ebert | 74/687 |
| 3,123,975 | 3/1964 | Ebert | 74/687 X |
| 3,293,848 | 12/1966 | Kuze | 180/307 X |
| 3,528,322 | 9/1970 | Schou | 74/687 |
| 3,805,641 | 4/1974 | Hause | 74/687 X |
| 3,902,567 | 9/1975 | Pekar, Jr. | 180/70 R |
| 4,111,003 | 9/1978 | Bolinger et al. | 60/469 |
| 4,514,978 | 5/1985 | Buschbom et al. | 60/426 |
| 4,627,237 | 12/1986 | Hutson | 60/490 X |
| 4,691,802 | 9/1987 | Ishimori et al. | 60/490 X |

FOREIGN PATENT DOCUMENTS

| 1800394 | 10/1968 | Fed. Rep. of Germany . | |
| 1800636 | 10/1968 | Fed. Rep. of Germany . | |
| 2264319 | 12/1972 | Fed. Rep. of Germany . | |
| 2406019 | 8/1975 | Fed. Rep. of Germany | 180/316 |
| 3125123 | 1/1983 | Fed. Rep. of Germany . | |
| 38-7172 | 5/1963 | Japan . | |
| 49-2337 | 1/1974 | Japan . | |
| 0002337 | 1/1974 | Japan . | |
| 49-47213 | 12/1974 | Japan . | |
| 55-16929 | 2/1980 | Japan . | |
| 60-37654 | 3/1985 | Japan . | |
| 0037654 | 3/1985 | Japan . | |
| 61-19158 | 2/1986 | Japan . | |
| 0263834 | 11/1986 | Japan | 180/308 |

Primary Examiner—Dwight Diehl
Attorney, Agent, or Firm—Irving M. Weiner; Joseph P. Carrier; Pamela S. Burt

[57] ABSTRACT

A hydraulic power transmission apparatus for reducing the speed of rotation of output from a power source and changing the speed of rotation thereof at a given transmission ratio, includes an oil pump having a drive shaft to which the power from the power source can be applied, the oil pump being drivable by the power from the power source, a pair of oil motors having output shafts, respectively, and associated with a pair of axles, respectively, the oil motors being drivable by hydraulic pressure generated by the oil pump, a pair of speed reducer mechanisms disposed between the outupt shafts of the oil motors and the axles for reducing the speeds of rotation of the output shafts, respectively, and transmitting the rotation of the output shafts to the axles, respectively, an inner case having a closed space defined therein, the oil pump and the oil motors being housing in the closed space, and a transmission case having a transmission chamber defined therein, the inner case and the speed reducer mechanisms being housed in the transmission case, the transmission case storing oil therein.

40 Claims, 16 Drawing Sheets

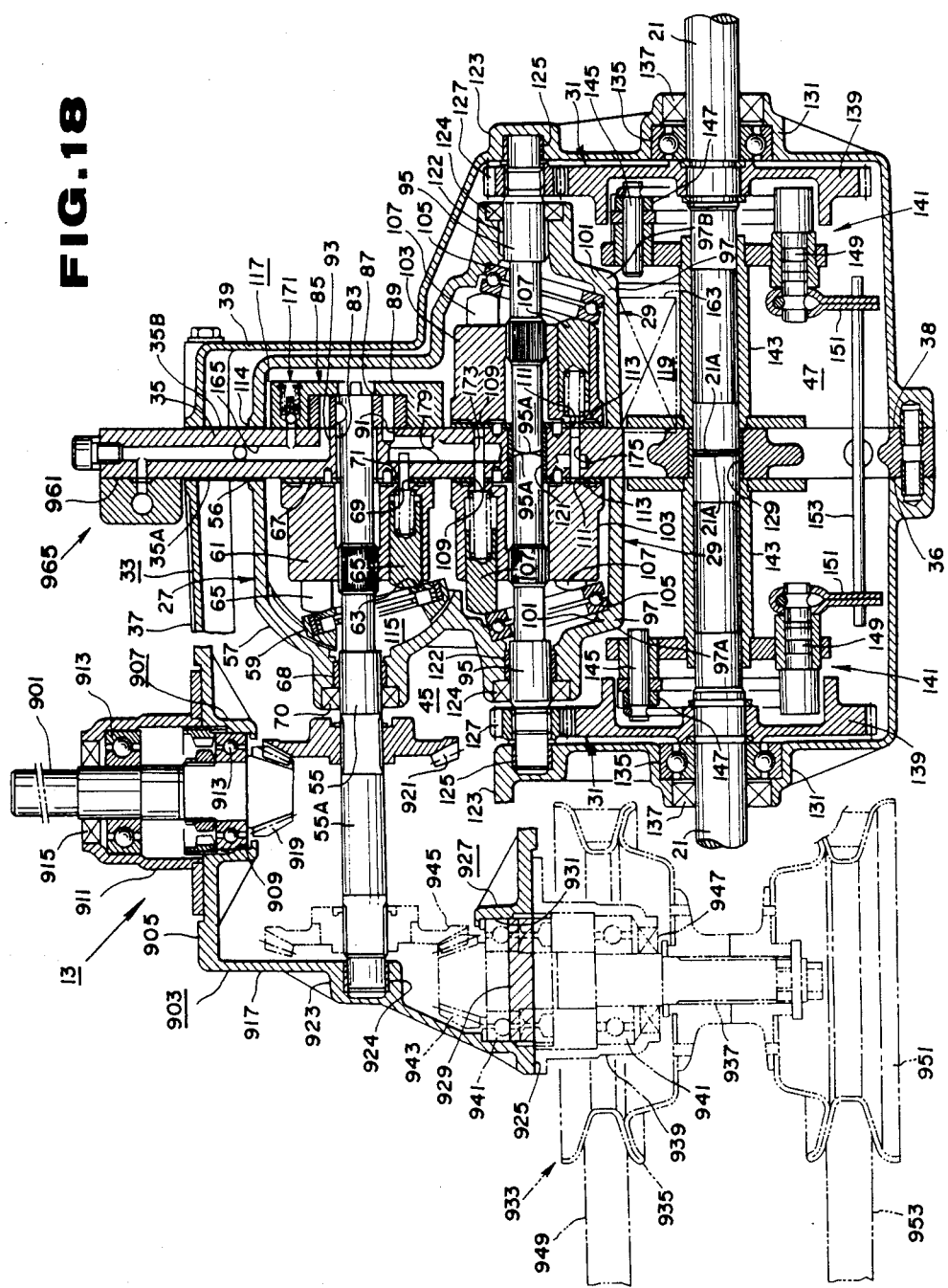

HYDRAULIC POWER TRANSMISSION APPARATUS

This is a continuation of application Ser. No. 07/155,996, filed Feb. 16, 1988.

BACKGROUND OF THE INVENTION

1. Field of the Invention:

The present invention relates to a power transmission apparatus, and more particularly to a hydraulic power transmission apparatus comprising an oil pump and an oil motor for changing the speed of rotation of an output shaft.

2. Description of the Relevant Art:

Various vehicles such as lawn mowers, tractors, and the like have power transmission apparati for reducing the speed of rotation of an output from a power source such as an engine, an electric motor, or the like and also for transmitting the power to the axles of drive wheels while changing the speed of rotation at a suitable transmission ratio.

One type of such power transmission apparatus comprises hydraulic devices such as an oil pump and an oil motor. The oil pump and the oil motor serve to change the speed of rotation at a desired transmission ratio, whereas the speed of rotation is reduced by a speed reducer mechanism coupling a plurality of gears.

Such a hydraulic power transmission apparatus is disclosed in Japanese Laid-Open Utility Model Publication No. 61-19158, for example. In the disclosed hydraulic power transmission apparatus, the oil pump and the oil motor are housed in a case which is separate from a transmission case housing the speed reducer mechanism.

Since the oil pump and the oil motor are disposed separately from the transmission case which accommodates the speed reducer mechanism, the power transmission apparatus is large in size, and the case is complex in shape and highly costly.

The disclosed power transmission apparatus also has two attachment plates. The case housing the oil pump and the oil motor is attached to one of the attachment plates, whereas an oil charge pump is assembled in the other attachment plate to which the transmission case housing the speed reducer mechanism is secured, the attachment plates being fastened to each other.

Oil passages interconnecting the oil pump, the oil motor, and the oil charge pump are defined in both of the attachment plates, and a pipe is employed to connect the oil charge pump and an oil reservoir.

The power transmission apparatus further includes an on/off valve for returning oil discharged from the oil pump to an oil tank to free the drive wheels.

However, with the on/off valve assembled in a base plate, the base plate must have a small hole in which the valve body of the on/off valve is inserted.

Japanese Laid-Open Utility Model Publication No. 60-37654 discloses another power transmission apparatus in which an oil pump and an oil motor are housed in a single case which has a breather mechanism for venting the space in the case to atmosphere.

According to another conventional apparatus disclosed in Japanese Patent Publication No. 38-7172, the drive shaft of an oil pump and a power source are coupled to each other by a power transmission shaft.

Japanese Patent Publication No. 49-2337 discloses another power transmission apparatus in which an oil pump and two oil motors are provided and a pair of speed reducer mechanisms are disposed at the output shafts of the oil motors, respectively.

SUMMARY OF THE INVENTION

This invention is an improvement of the abovementioned hydraulic power transmission apparatus for lawn mowers, tractors, and the like.

It is a first object of the present invention to provide a power transmission apparatus which is unitized and made compact while keeping an oil pump and an oil motor well cooled, and which prevents oil leakage as much as possible.

A second object of the present invention is to provide a power transmission apparatus which can be machined and assembled easily and highly accurately, has a simple oil passage structure, and can be manufactured at a reduced cost.

A third object of the present invention is to provide a power transmission apparatus which has an oil pump and an oil motor that are of increased durability and prevent air from being entrapped therein, and which can easily be adapted to vehicles of different types.

According to the present invention, there is provided a power transmission apparatus for reducing the speed of rotation of an output from a power source and changing the speed of rotation thereof at a given transmission ratio, comprising an oil pump having a drive shaft to which the power from the power source can be applied, the oil pump being drivable by the power from the power source, a pair of oil motors having output shafts, respectively, and associated with a pair of axles, respectively, the oil motors being drivable by hydraulic pressure generated by the oil pump, a pair of speed reducer mechanisms disposed between the output shafts of the oil motors and the axles for reducing the speeds of rotation of the output shafts, respectively, and transmitting the rotation of the output shafts to the axles, respectively, an inner case having a closed space defined therein, the oil pump and the oil motors being housed in the closed space, and a transmission case having a transmission chamber defined therein, the inner case and the speed reducer mechanisms being housed in the transmission case, the transmission case storing oil therein.

The above and further objects, details and advantages of the present invention will become apparatus from the following detailed description of preferred embodiments thereof, when read in conjunction with the accompanying drawings.

BRIEF DESCRIPTION OF THE DRAWINGS

FIG. 18 is a developed cross-sectional view of the power transmission apparatus shown in FIG. 16.

DETAILED DESCRIPTION OF THE PREFERRED EMBODIMENTS

Figure 1:
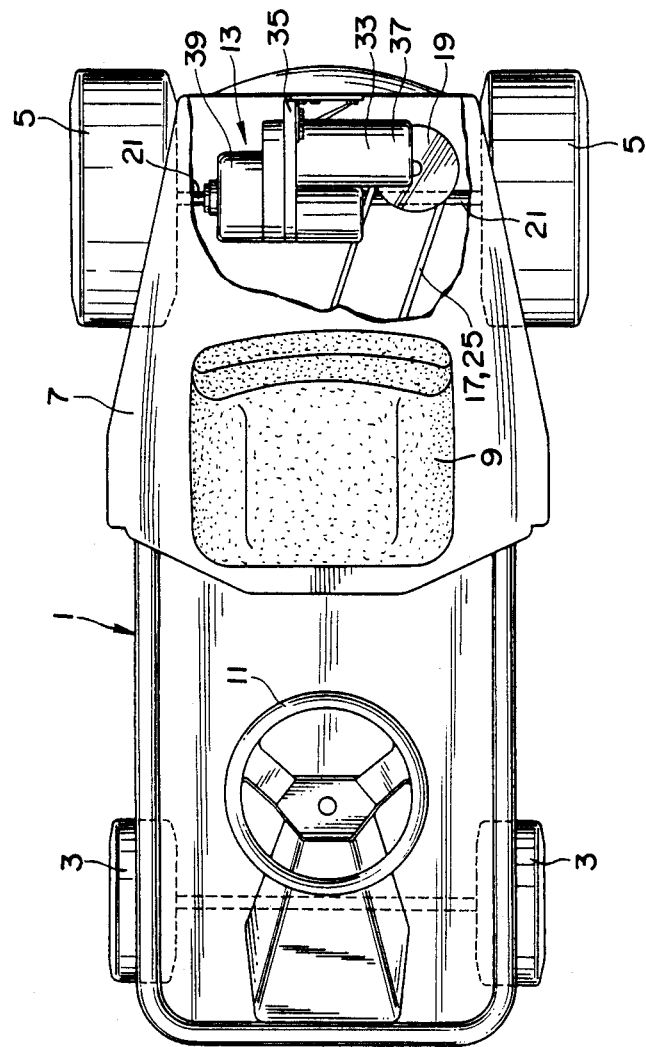
FIG. 1 is a plan view, partly cut away, of a riding-type mower incorporating a power transmission apparatus according to a first embodiment of the present invention.
Figure 2:
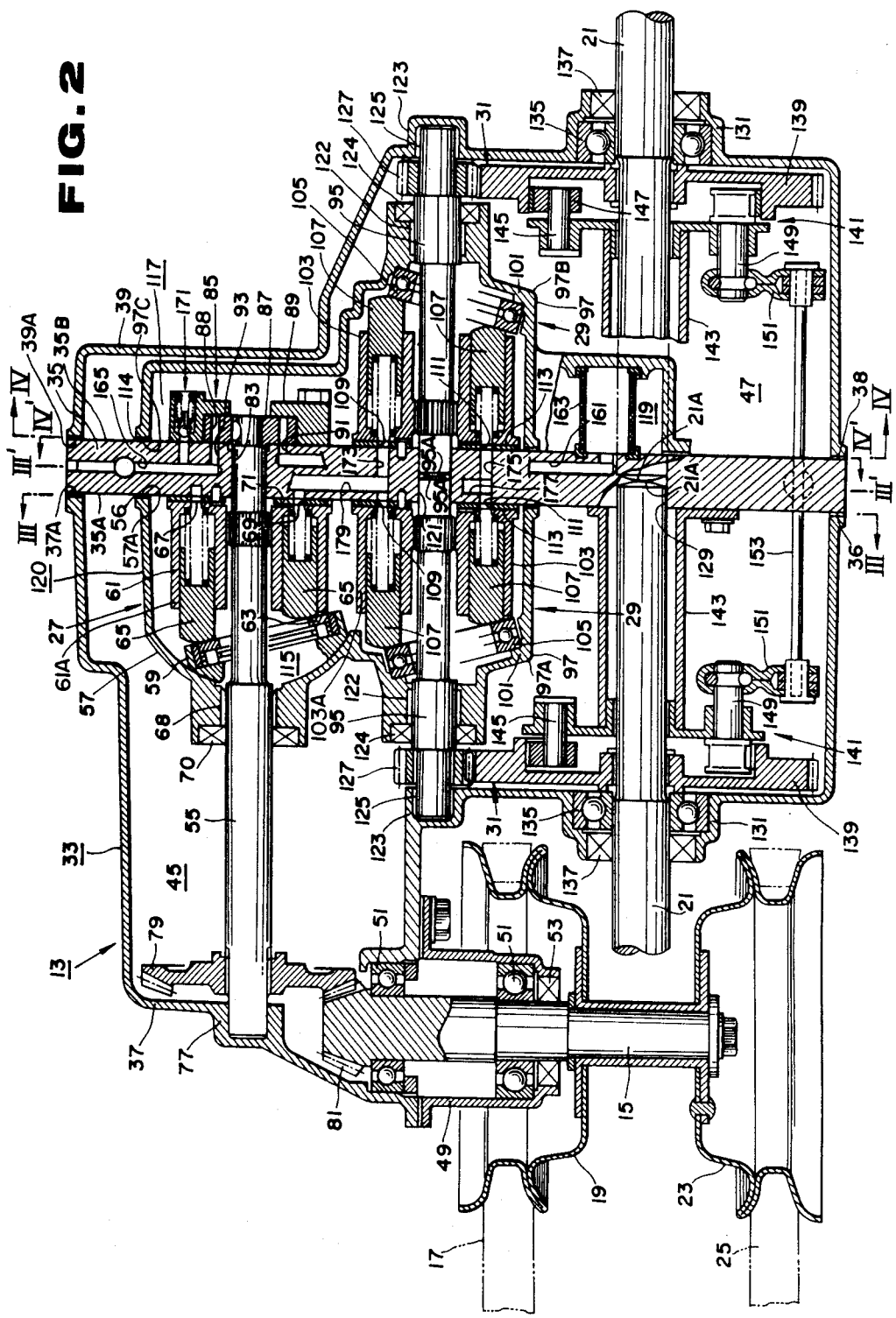
FIG. 2 is a developed cross-sectional view of the power transmission apparatus shown in FIG. 1.

Like or corresponding parts are denoted by like or corresponding reference numerals throughout the views.

A power transmission apparatus according to a first embodiment of the present invention will first be described with reference to FIGS. 1 through 4.

As shown in FIG. 1, a riding-type lawn mower 1 has a pair of laterally spaced front wheels 3, a pair of laterally spaced rear wheels 5, a cutter housing 7 accommodating a grass cutter (not shown), a driver's seat 9, and a steering wheel 11. A power transmission apparatus 13 of the invention is disposed between the rear wheels 5.

Front, rear, left, right, upper, lower, and terms similar to these directional references are used herein with reference to the geometry of the riding-type lawn mower 1.

The riding-type lawn mower 1 has an engine (not shown) as a power source. In this embodiment, the power from the engine is applied to an input shaft 15 (FIG. 2) of the power transmission apparatus 13 through a belt 17 and a pulley 19. Part of the applied engine power is transmitted through the power transmission apparatus 13 to lefthand and righthand axles 21, whereas part of the applied engine power is transmitted from the input shaft 15 via a pulley 23 and a belt 25 to the grass cutter (not shown) disposed in the cutter housing 7.

The power transmission apparatus 13 generally comprises an oil pump 27, a pair of oil motors 29 actuatable by the oil pump 27, a pair of speed reducer mechanisms 31 disposed between the oil motor 29 and the axles 21, and a transmission case 33. The axles 21 are coaxially aligned with each other.

The transmission case 33 has a base plate 35 having opposite flat attachment surfaces 35A, 35B, and lefthand and righthand outer cases 37, 39 having surfaces 37A, 39A held against the attachment surfaces 35A, 35B, respectively,, through gaskets 36, 38, the outer cases 37, 39 being fastened to each other by bolts. The outer cases 37, 39 have flanges 41, 43 (FIGS. 3 and 4) fastened to each other by the bolts.

The outer cases 37, 39 define respective transmission chambers 45, 47, respectively, therein on opposite sides of the base plate 35. The two transmission chambers 45, 47 are held in communication with each other through a communication hole defined through the base plate 35. The transmission chambers 45, 47 store lubricating oil, which can be served as a working medium for the oil pump 27, an oil charge pump 85 (discussed further hereinbelow), and the oil motors 29. The oil pump 27, the oil motors 29, the speed reducer mechanism 31, and the inner end portions of the axles 21 are housed in the transmission chambers 45, 47.

The input shaft 15 is vertically supported on a bracket 49 attached to an outer end of the lefthand outer case 37 by bearings 51 and an oil seal 53.

The oil pump 27 has a drive shaft 55 disposed leftwardly (FIG. 2) of the base plate 35 parallel to the axles 21. In the illustrated embodiment, the oil pump 27 comprises a variable-displacement swash-plate axial-piston pump.

The oil pump 27 has a pump case 57 having an attachment surface 57A held against the lefthand attachment surface 35A of the base plate 35 through a gasket 56, the pump drive shaft 55 extending through the pump case 57 and rotatable by the engine power, a swash plate 59 supported in the pump case 57 so as to be tiltable to different angles to the axis of the drive shaft 55, a cylinder block 61 having a plurality of cylinders 61A disposed in an annular pattern concentric with the drive shaft 55 and parallel to each other, the cylinder block 61 being splined to the input shaft 55 for rotation therewith, a plurality of pistons 65 disposed respectively in the cylinders 61A and having distal ends held against a thrust bearing 63, the pistons 65 being reciprocally movable in response to rotation of the pump drive shaft 55 about its own axis, and a valve plate 71 having an inlet port 67 and an outlet port 69 defined therein. Denoted in FIG. 2 at 68 is a bearing and at 70 is an oil seal which may incompletely seal or not hermetically seal, the shaft 55.

The swash plate 59 is operatively coupled to a transmission shift lever (not shown) disposed near the steering wheel 11 through a transmission control mechanism 701 comprising a shaft 73, a lever 75, and the like. Thus, the angle of inclination of the swash plate 59 with respect to the drive shaft 55 can be varied by operating the transmission shift lever. Therefore, by operating the transmission shift lever, the rate of flow of oil discharged from the oil pump 27 can be freely varied within a predetermined angle to select forward, neutral, and reverse positions, for example.

The lefthand end of the pump drive shaft 55 is supported in a bearing 77 of the lefthand outer case 37, and supports a fixed bevel gear 79 meshing with a bevel gear 81 of the input shaft 15, so that the pump drive shaft 55 can be rotated by the rotation of the input shaft 15.

The righthand end of the pump drive shaft 55 extends through a bearing hole 83 defined in the base plate 35 and projects from the righthand attachment surface 35B of the base plate 35. An oil charge pump 85 is mounted on the projecting righthand end of the pump drive shaft 55 for supplying oil to the inlet port 67 of the oil pump 27. In this embodiment, the oil charge pump 85 comprises a gear pump in the form of a trochoid pump.

The oil charge pump 85 is coaxial with the oil pump 27 and mainly comprises an external gear 87 rotatable with the pump drive shaft 55, an internal gear 88 meshing with the external gear 87, a casing 89 housing the external and internal gears 87, 88, an inlet port 91, and an outlet port 93.

The oil motors 29 have respective output shafts 95 disposed coaxially on the attachment surfaces 35A, 35B of the base plate 35 parallel to the axles 21. In the illustrated embodiment, the oil motors 29 comprise fixedly-displacement, swash-plate, axial-piston motors, respectively.

Each of the oil motors 29 comprises a motor case 97, the output shaft 95 being disposed in the motor case 97, a swash plate 101 disposed in the motor case 97 obliquely to the axis of the output shaft 95, a cylinder block 103 having a plurality of cylinders 103A disposed on an annular pattern concentric with the output shaft 95, the cylinder block 103 being splined to the output shaft 95 for rotation therewith, a plurality of pistons 107 disposed respectively in the cylinders 103A and held against a thrust bearing 105 of the swash plate 101 for reciprocal movement, and a valve plate 113 having an inlet port 109 and an outlet port 111.

The motor case, denoted at 97A, of the oil motor 29 attached to the lefthand attachment surface 35A of the base plate 35 is integrally formed with the case 57 of the oil pump 27, whereas the motor case, denoted at 97B, of the oil motor 29 attached to the righthand attachment surface 35B of the base plate 35 extends in covering relation to the oil charge pump 85. The motor case 97B has an attachment surface 97C held against the righthand attachment surface 35B through a gasket 114, and is fastened to the righthand attachment surface 35B by means of bolts. The motor cases 97A, 97B have fastening flanges 106, 108 shown in FIGS. 3 and 4.

The motor cases 97A, 97B define spaces 115, 117 on the opposite sides of the base plate 35, the spaces 115, 117 being held in communication with each other through a hole (not shown) defined through the base plate 35. The spaces 115, 117 are filled with oil serving as a working medium for the oil pumps 27, 85 and the oil motors 29. The righthand case 97B has an oil reservoir 119 projecting downwardly from a lower portion thereof. The interior spaces of the cases 97A, 97B therefore double as oil tanks, and the oil reservoir 119 may be communicated with the transmission chamber 47.

The cases 97A, 97B jointly constitute an inner case 120 housing the oil pumps 27, 85 and the oil motors 29 in the closed spaces 115, 117.

The inner ends of the output shafts 95 are supported in a bearing hole 121 defined in the base plate 35, and have end surfaces 95A abutting against each other in the bearing hole 121. Denoted in FIG. 2 at 122 are bearings and at 124 are oil seals which may incompletely seal, or not hermetically seal, the shaft 95.

The output shafts 95 have respective outer ends supported by bearings 125 in bearing supports 123 of the lefthand and righthand outer cases 37, 39. The outer end portions of the output shafts 95 support smaller-diameter speed reducer gears 127, respectively.

The lefthand and righthand axles 21 have inner ends supported in a bearing hole 129 defined in the base plate 35, and inner end portions supported by bearings 135 and oil seals 137 in bearing supports 131 of the lefthand and righthand outer cases 37, 39. The inner ends of the axles 21 have end faces 21A held against each other in the bearing hole 129. The rear wheels 5 are mounted respectively on the outer ends of the axles 21.

Larger-diameter speed reducer gears 139 meshing with the smaller-diameter speed reducer gears 127 are mounted on the respective axles 21 near the cases 37, 39. The speed reducer gears 127, 139 jointly constitute the speed reducer mechanisms 31 for reducing the speed of rotation of the output shafts 95 of the oil motors 29.

A brake mechanism 141 for braking the axle 21 is positioned on the inner side of each of the speed reducer gears 139. The brake mechanism 141 comprises a case 143 attached to the base plate 35, an anchor pin 145 supported on the case 143, a brake shoe 147 supported on the anchor pin 145, and a cam 149 supported on the case 143 for spreading the brake shoe 147 outwardly. The cam 149 is operatively coupled to a cam operating member through a coupling 151, a rod 153, a coupling 155 (FIG. 4), a rod 157, and a lever 159.

Oil passages of the oil pumps 27, 85 and the oil motors 29 will be described below.

The inlet port 91 of the oil charge pump 85 is supplied with oil through an inlet passage 161 defined in the base plate 35 and opening into the oil reservoir 119 through a filter 163.

Oil discharged from the outlet port 93 of the oil charge pump 85 is guided through an outlet passage 165 extending upwardly and defined substantially centrally in the base plate 35 in the transverse direction thereof (in the fore-and-aft direction of the lawn mower). The outlet passage 165 has an upper portion communicating with a front branch passage 167 extending in the forward direction and a rear branch passage 169 extending in the rearward direction. The outlet passage 165 is connected to a relief valve 171.

The inlet ports 109 of the oil motors 29 communicate with each other by an oil passage 173 defined transversely through the base plate 35, i.e., transversely of the lawn mower, and the outlet ports 111 of the oil motors 29 communicate with each other by an oil passage 175 defined transversely through the base plate 35, i.e., transversely of the lawn mower.

The inlet port 67 of the oil pump 27 and the oil passage 175 communicate with each other through a front vertical oil passage 177 defined in the base plate 35 at a position forward of the center of the base plate 35 in the transverse direction thereof (in the fore-and-aft direction of the lawn mower). The outlet port 69 of the oil pump 27 and the oil passage 173 communicate with each other through a rear vertical oil passage 179 defined in the base plate 35 at a position rearward of the center of the base plate 35 in the transverse direction thereof (in the fore-and-aft direction of the lawn mower).

Figure 3:
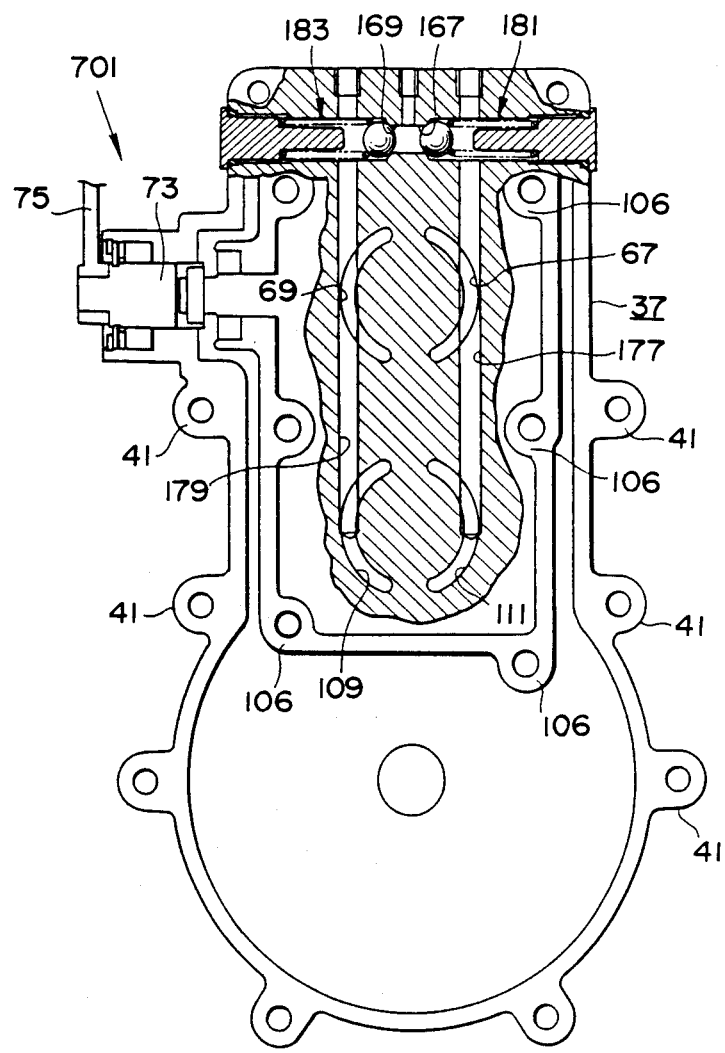
FIG. 3 is the combination of cross-sectional views taken along lines III—III and III'—III' of FIG. 2.
Figure 4:
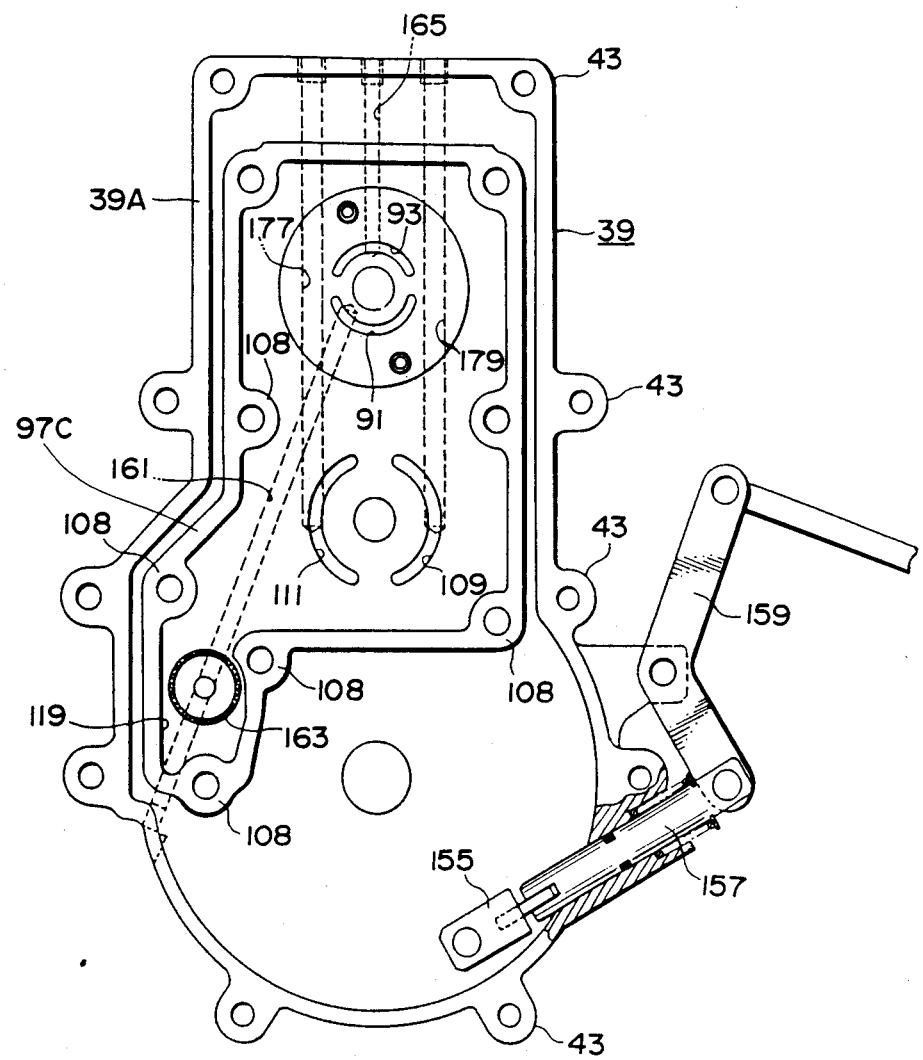
FIG. 4 is the combination of cross-sectional views taken along lines IV—IV and IV'—IV' of FIG. 2.

As shown in FIG. 3, the front oil passage 177 has an upper portion communicating with the front branch passage 167 through a check valve 181, and the rear oil passage 179 has an upper portion communicating with the rear branch passage 169 through a check valve 183.

Operation of the power transmission apparatus 13 will be described below.

The drive shaft 55 is rotated about its own axis by the engine power to cause the oil charge pump 85 to supply oil to the front oil passage 177 via the inlet passage 161, the outlet passage 165, and the front branch passage 167. At the same time, upon forward movement of the lawn mower, the rotation of the drive shaft 55 causes the cylinder block 61 to rotate for thereby reciprocally moving the pistons 65, drawing oil from the front oil passage 177 and the inlet port 67 and supplying oil to the oil motors 29 through the outlet port 69, the rear oil passage 179, the oil passage 173, and the inlet ports 109. The pistons 107 of the oil motors 29 are reciprocally moved to rotate the cylinder blocks 103 and also the output shafts 95, whereupon the engine power is transmitted via the speed reducer mechanisms 31 to the axles 21. Oil flows from the outlet ports 111 and the oil passage 175 to the front oil passage 177, from which the oil is circulated to the inlet port 67 of the oil pump 27.

The power transmission apparatus can be controlled for different transmission positions by altering the angle of inclination of the swash plate 59. In the neutral position, the swash plate 59 is held parallel to the base plate 35, and hence the pistons 65 are not reciprocally moved. The check valves 181, 183 remain closed, returning oil from the relief valve 171 into the oil reservoir 119.

In the reverse position, the angle of inclination of the swash plate 59 is opposite to that of the swash plate 59 in the forward position. Oil supplied from the oil pump 85 is drawn, in the opposite direction to that in the forward position, from the rear branch passage 169 via the rear oil passage 179 to the outlet port 69 of the oil pump 27, discharged from the inlet port 67, and supplied from front oil passage 177 via the oil passage 175 to the outlet ports 111 of the oil motors 29. The output shafts 95 are now rotated in the opposite direction to that in the forward position, whereupon oil is circulated from the inlet port 109 via the oil passage 173 and the rear oil passage 179 to the outlet port 69 of the oil pump 27. In the forward and reverse positions, the oil is circulated while being replenished by the oil pump 85.

The oil discharged from the oil pump 27 is suitably distributed to the oil motors 29. The total amount of oil supplied from the oil pump 27 is equal to the total amount of oil discharged from the oil motors 29. Therefore, when the lawn mower 1 makes a turn, there is a difference developed between the speeds of rotation of the axles 21.

According to the above embodiment, the inner case 120 is cooled by the lubricating oil in the transmission case 33, and the heat in the inner case 120 is radiated out via the large transmission case 33. Therefore, the cooling efficiency of the transmission apparatus is increased, and conventional heat radiator means such as fins may be dispensed with. The inner case 120 may thus be simplified in structure for a cost reduction.

Since the oil pumps 27, 85 and the oil motors 29 are covered with a double-walled construction, such as the inner cases 97A, 97B and the outer cases 37, 39, the power transmission apparatus produces less noise especially when the lawn mower is started and accelerated, and any oil leakage from the inner cases 97A, 97B can be stopped by the outer cases 37, 39.

The inner cases 97A, 97B may be incompletely sealed or not hermetically sealed, and the outer cases 37, 39 may be hermetically sealed completely. With such an arrangement, when the output shafts 95 of the oil motors 29 are stalled, for example, oil will leak out of the inner cases 97A, 97B to prevent a large pressure buildup from being developed in the inner cases 97A, 97B. Thus, the oil pump 27 and the oil motors 29 are made durable.

The drive shaft 55 of the oil pump 27 and the output shafts 95 of the oil motors 29 extend parallel to the axles 21, and the drive shaft 55 is shared by the oil pump 27 and the oil charge pump 85 which are disposed in coaxial relation to each other. Therefore, the oil pump 27, the oil charge pump 85, the oil motors 29, and the speed reducer mechanism 31 are stored in a compact arrangement, resulting in a simplified construction and a reduction in the number of parts required.

Inasmuch as the speed reducer mechanisms 31 are disposed between the output shafts 95 of the oil motors 29 and the axles 21 in the power transmission path, the oil pump 27 and the oil motors 29 may be of the low-torque, high-speed type, and hence may be small in size. Since the sealed surfaces of the oil pump 27 and the oil motors 29 may be smaller, their sealed condition is improved for increased power transmission efficiency.

The outer cases 37, 39 and the inner cases 97A, 97B are not required to have attachment surfaces for the oil pumps 27, 85 and the oil motors 29, but are only required to have the attachment surfaces 37A, 39A for the base 35. As a consequence, the outer cases 37, 39 and the inner cases 97A, 97B can be easily machined.

The oil pump 27, the oil charge pump 85, the oil motors 29, the inner cases 97A, 97B, and the outer cases 37, 39 can successively be installed with the attachment surfaces 35A, 35B of the base plate 35 being used as a reference. Therefore, the power transmission apparatus 13 can be assembled highly accurately and easily.

The oil passages interconnecting the oil pump 27, the oil charge pump 85, the oil motors 29, and the oil reservoir 119 are all defined in the base plate 35. This allows the power transmission apparatus 13 to be constructed simply without using oil pipes.

The oil charge pump 85 employed in the above embodiment may be dispensed with. While the oil pump 27 comprises an axial piston pump and the oil motors 29 are axial piston motors in the above embodiment, the oil pump 27 and the oil motors 29 are not limited to the illustrated type, but may be of any of various other types.

At least one of the oil pump 27 and each of the oil motors 29 should be of the variable-displacement type, and the output shafts 95 of the two oil motors 29 may double as the respective axles 21.

In the illustrated embodiment, the two oil motors 29 are associated respectively with the axles 21. However, a single oil motor 29 may be disposed in the case 97A or the case 97B for driving both of the axles 21.

The brake mechanism 141 may be omitted from the power transmission apparatus 13 since the oil pump 27 and the oil motors 29 are capable of braking the lawn mower when it is braked.

The oil reservoir 119 in the inner case 120 may be dispensed with, and the oil filter 163 may be mounted in the transmission case 33 for supplying oil in the transmission case 33 through the filter 163 to the oil charge pump 85 via an oil passage defined in the base plate 35.

A power transmission apparatus according to a second embodiment of the present invention will be described below with reference to FIGS. 5 through 9. Those parts of the second embodiment which are identical to those of the first embodiment are denoted by identical reference numerals and will not be described in detail.

Figure 5:
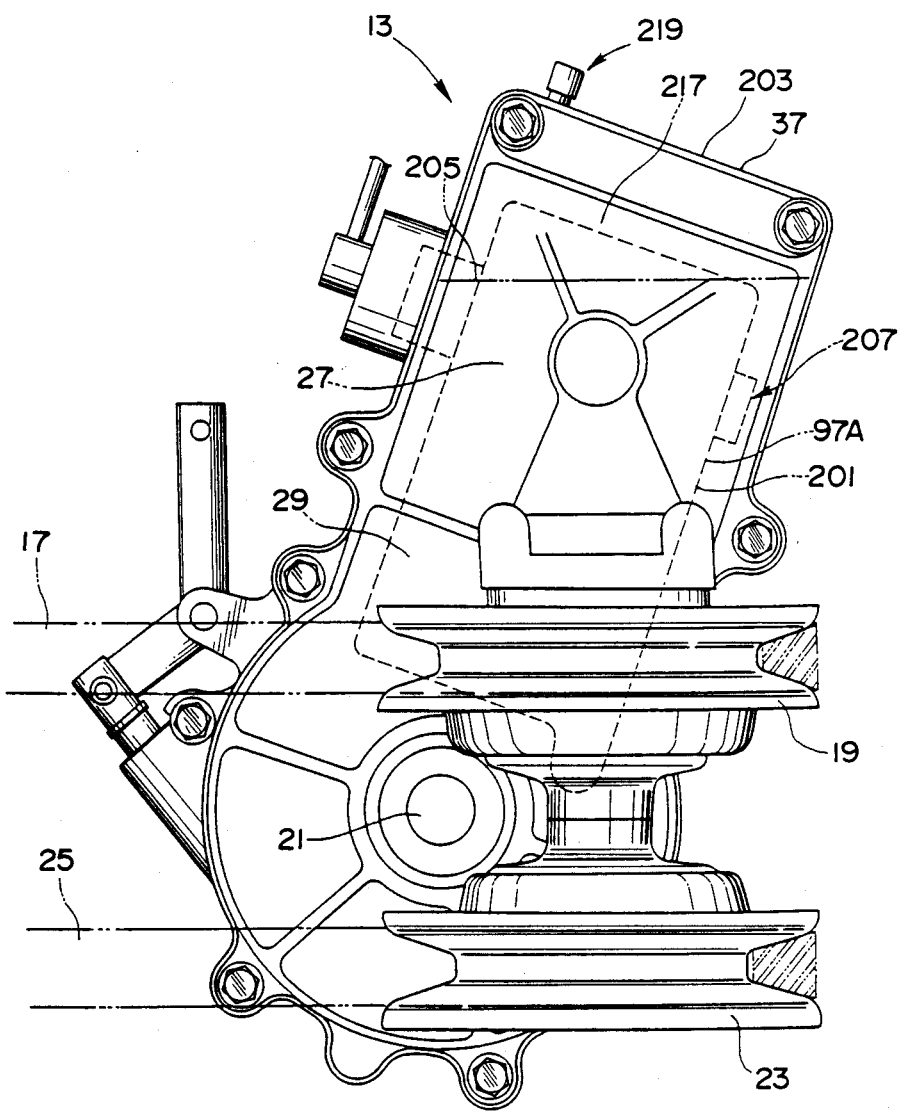
FIG. 5 is a lefthand side elevational view of a power transmission apparatus according to a second embodiment of the present invention.
Figure 6:
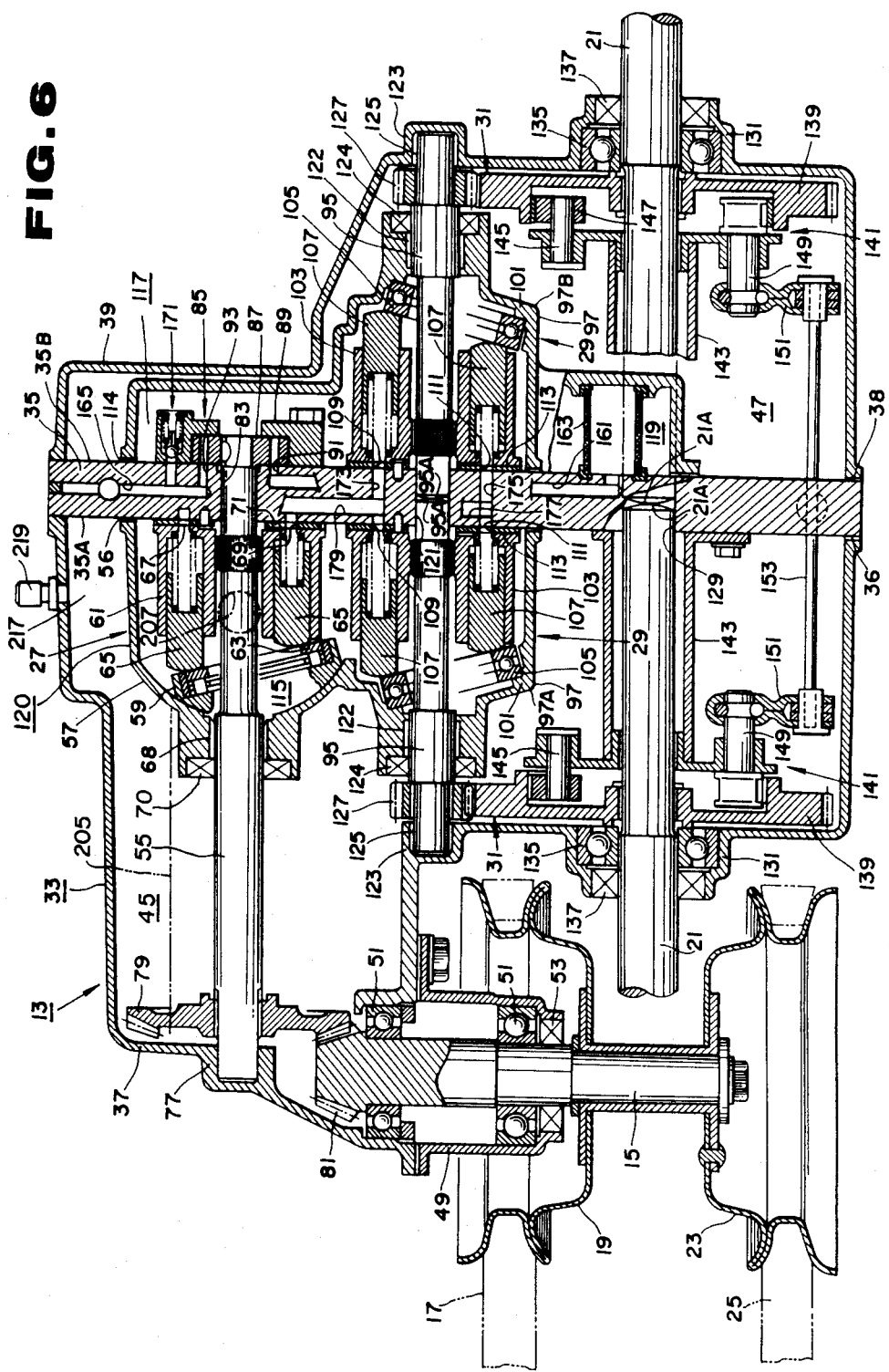
FIG. 6 is a developed cross-sectional view of the power transmission apparatus shown in FIG. 5.
Figure 7:
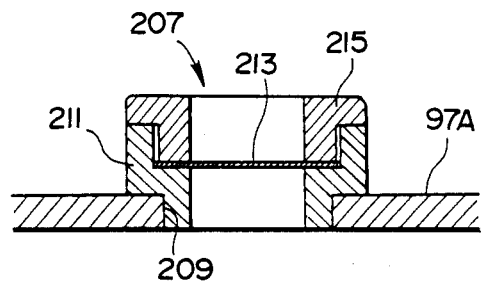
FIG. 7 is a cross-sectional view of a first breather mechanism.

According to the second embodiment, as shown in FIGS. 5 through 7, a breather mechanism 207 is mounted on a wall of the lefthand motor case 97A below or near a surface level 205 of oil stored in the transmission case 33, the breather mechanism 207 communicating between the space in the transmission case 33 and the space in the inner case 120.

The breather mechanism 207 comprises a hole 209 defined through the wall of the motor case 97A, a tubular holder 211 fitted in the hole 209 under a small pressure, a filter 213 in the form of a mesh screen, and a tubular cap 215 by which the filter 213 is attached to the holder 211.

Figure 8:
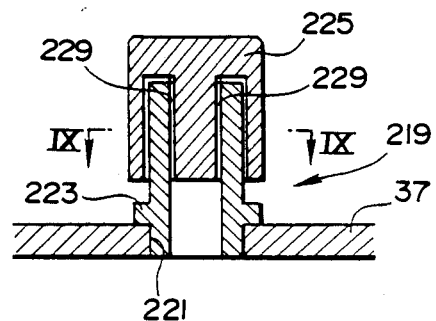
FIG. 8 is a cross-sectional view of a second breather mechanism.

As shown in FIGS. 5 and 8, a breather 219 is mounted on an upper wall of the lefthand case 37, providing communication between a space 217 above the surface level 205 of oil in the transmission case 33 and the exterior of the transmission case 33.

Figure 9:
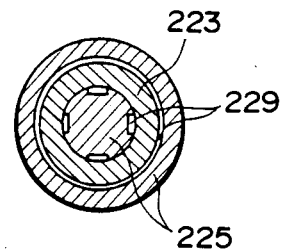
FIG. 9 is a cross-sectional view taken along line IX—IX of FIG. 8.

The breather 219 comprises a hole 221 defined in the upper wall of the lefthand case 37, a tubular holder 223 fitted in the hole 221 under a small pressure, and a cap 225 detachably mounted on the holder 223. Between the holder 223 and the cap 225, there are defined passages 229 venting the space 217 to atmosphere, as shown in FIG. 9.

With the second embodiment, oil can flow between the inner case 120 and the transmission case 33 through the breather mechanism 207 having the filter 213 which prevents foreign matter from being trapped in the inner case 120. Thus, the temperature in the inner case 120 can be prevented from rising, and the oil pump 27 and the oil motors 29 have increased durability. Since the breather mechanism 207 is positioned below or near the oil surface level 205, no air is trapped into the inner case 120, and the oil pump 27 and the oil motors 29 do not entrap air.

Because the breather mechanism 219 vents the space 217 above the oil surface level 205 to atmosphere, the pressure in the transmission case 33 is equalized to atmospheric pressure, so that the transmission case 33 is improved in durability.

FIGS. 10 through 13 illustrate a power transmission apparatus according to a third embodiment of the present invention.

Figure 10:
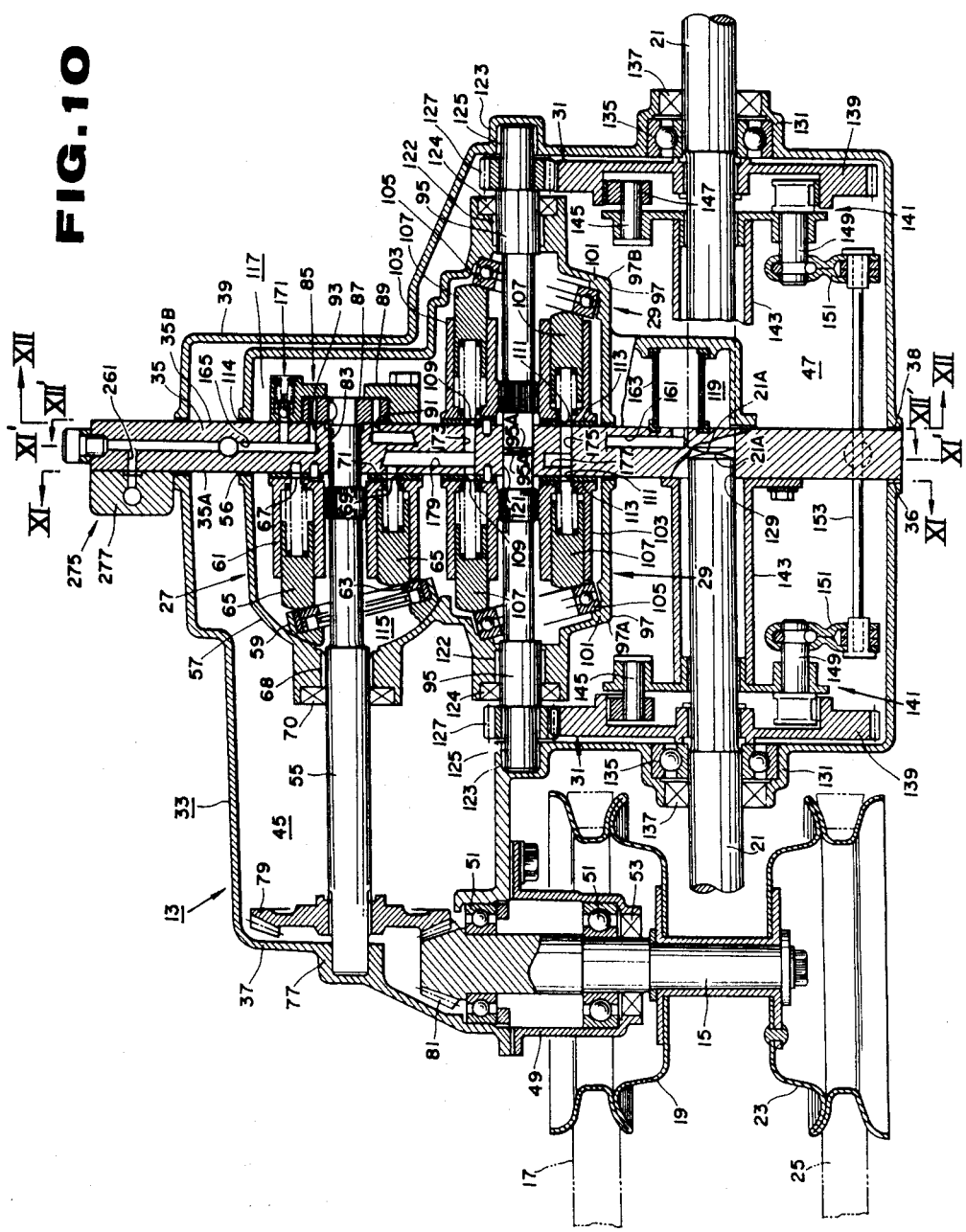
FIG. 10 is a developed lefthand side elevational view of a power transmission apparatus according to a third embodiment of the present invention.
Figure 11:
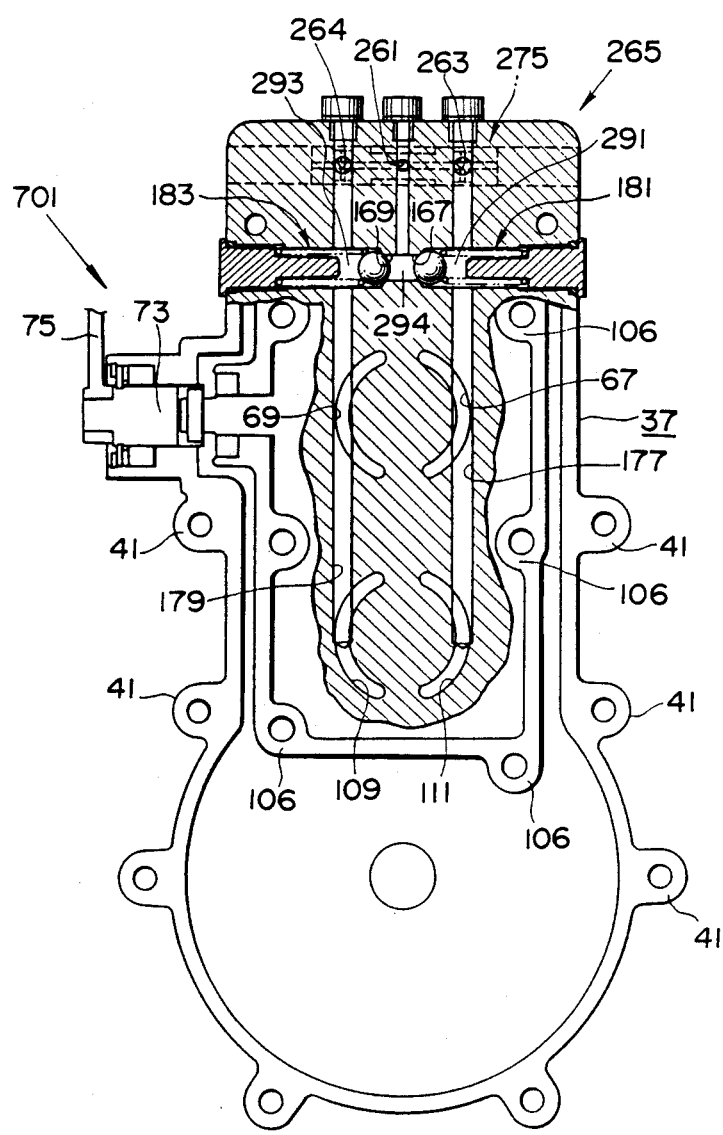
FIG. 11 is the combination of cross-sectional views taken along lines XI—XI and XI'—XI' of FIG. 10.
Figure 12:
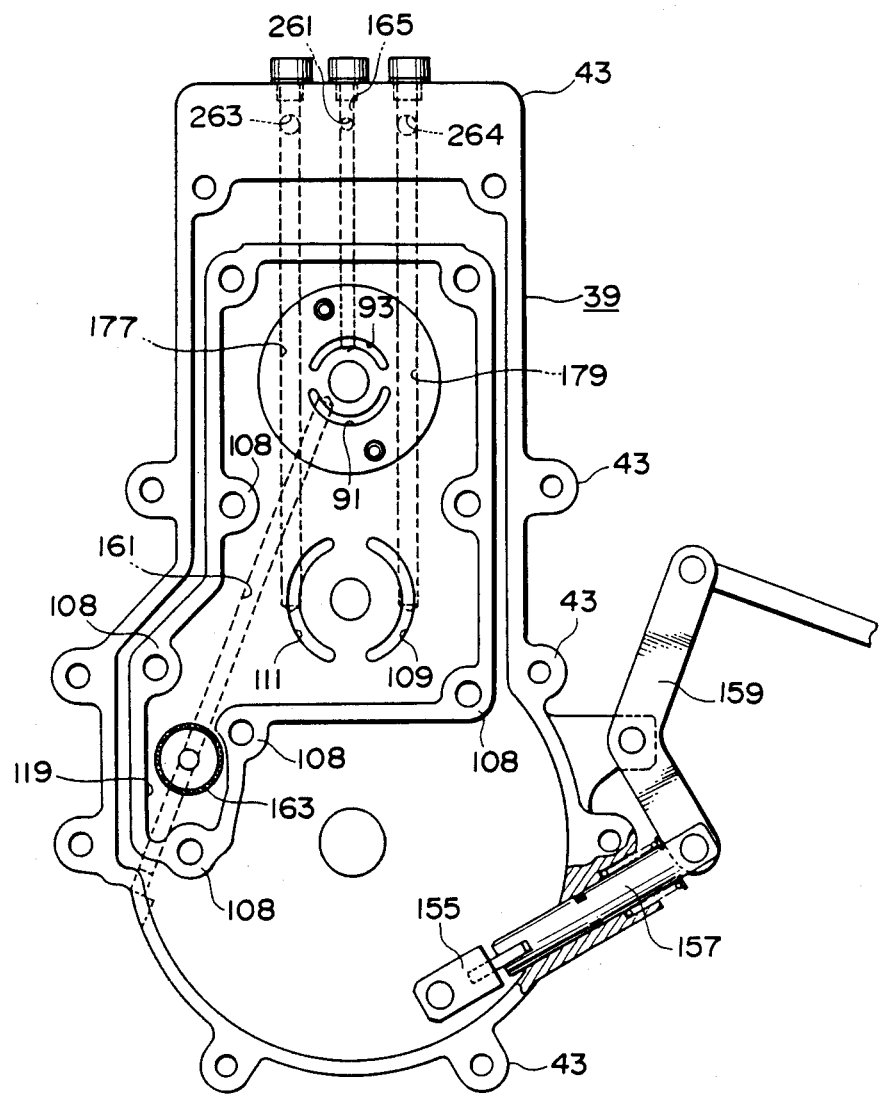
FIG. 12 is the combination of cross-sectional views taken along lines XII—XII and XII'—XII' of FIG. 10.

In this embodiment, as shown in FIGS. 10 through 12, the outlet passage 165, the front oil passage 177, and the rear oil passage 179 extend upwardly and are open at the lefthand side surface of the base plate 35 above the lefthand outer case 37 through oil passages 261, 263, 264, respectively.

An on/off valve 275 is attached to an upper end portion of of the lefthand attachment surface 35A of the base plate 35 which projects upwardly from the lefthand outer case 37.

Figure 13:
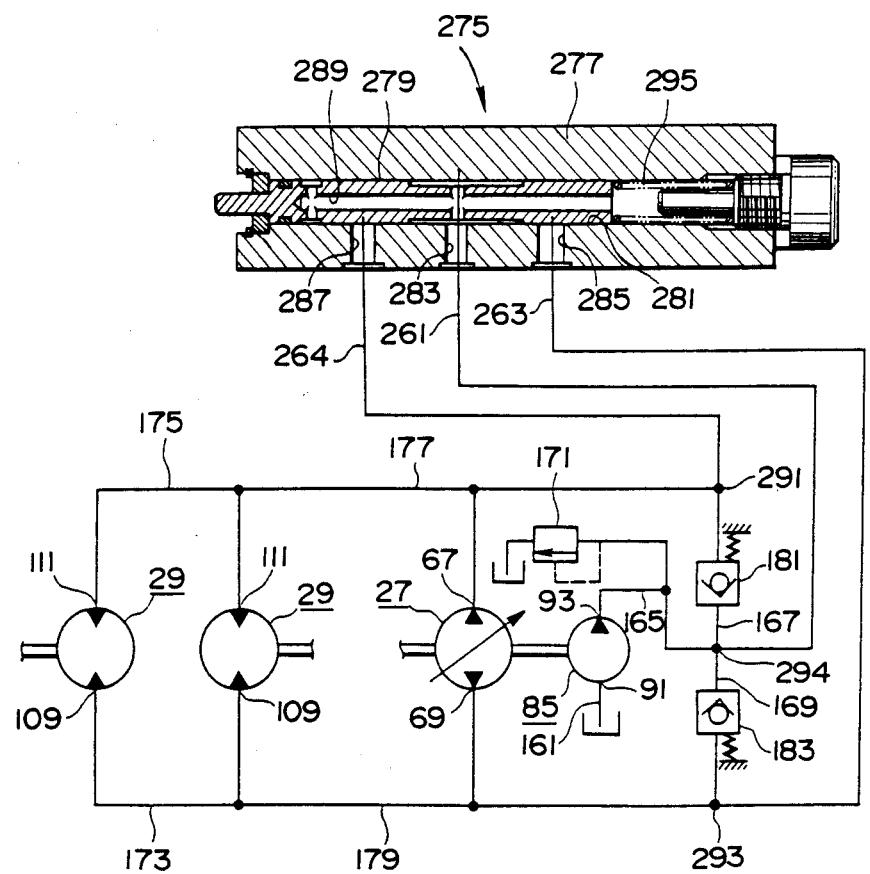
FIG. 13 is a view showing an off/off valve in cross section and a hydraulic circuit.

As shown in FIG. 13, the on/off valve 275 comprises a case 277 and a valve body 279 slidably disposed in the case 277.

The case 277 has a valve insertion hole 281 defined therein and three oil passages 283, 285, 287 defined therein and communicating with the valve insertion hole 281, the oil passages 283, 285, 287 opening at one side surface of the case 277. The valve body 279 has an inner oil passage 289 defined therein. The oil passages 283, 285, 287 are connected to the oil passages 261, 263, 264, respectively.

The on/off valve 275 is operated to selectively bring into and out of mutual communication oil passage portions 291, 293 downstream of the check valves 181, 183 and an oil passage portion 294 upstream of the check valves 181, 183. The valve body 279 of the on/off valve 275 is normally urged to the left (FIG. 13) under the resiliency of a spring 295. In the illustrated position, the oil passage portions 291, 293, 294 are held out of mutual communication by the valve body 279. The on/off valve 275 can be actuated by a neutral lever (not shown) disposed near the steering wheel. By pushing the valve body 279 to the right from the illustrated position, the oil passage portions 291, 293, 294 are brought into communication with each other.

Therefore, irrespective of which position the power transmission apparatus 13 takes, oil discharged from the outlet port 69 of the oil pump 27 is returned to the inlet port 67, or oil discharged from the inlet port 67 is returned to the outlet port 69 by operating the on/off valve 275, and the oil motors 29 are not actuated making the axles 21 free.

In this embodiment, the drive wheels 5 can be freed by operating the on/off valve 275 to allow the lawn mower to be easily maneuvered.

The on/off valve 275 is mounted on the base plate 35 near the oil pump 27. Therefore, the oil passages interconnecting the on/off valve 275, the oil pump 27, and the oil motors 29 are short and simple.

While the outer cases 37, 39 are attached to the base plate 35 in the illustrated embodiment, the outer cases 37, 39, the speed reducer mechanisms 31, the righthand motor case 97B, and the righthand oil motor 29 may be dispensed with, and a hydraulic transmission apparatus 13 may be composed of the lefthand motor case 97A, the oil pump 27, the lefthand oil motor 29, and the on/off valve 275. The on/off valve 275 is not limited to the illustrated spool valve, but may be of any other type.

Although the oil pump 27 and the oil motors 29 are shown as being interconnected by the closed hydraulic circuit, they may be interconnected by an open hydraulic circuit.

In the above embodiment, oil discharged from the oil pump 27 is returned to the oil passage portions 291, 293, 294 by the on/off valve 275. However, oil discharged from the oil pump 27 may be returned to the oil tank by the on/off valve 275.

Figure 14:
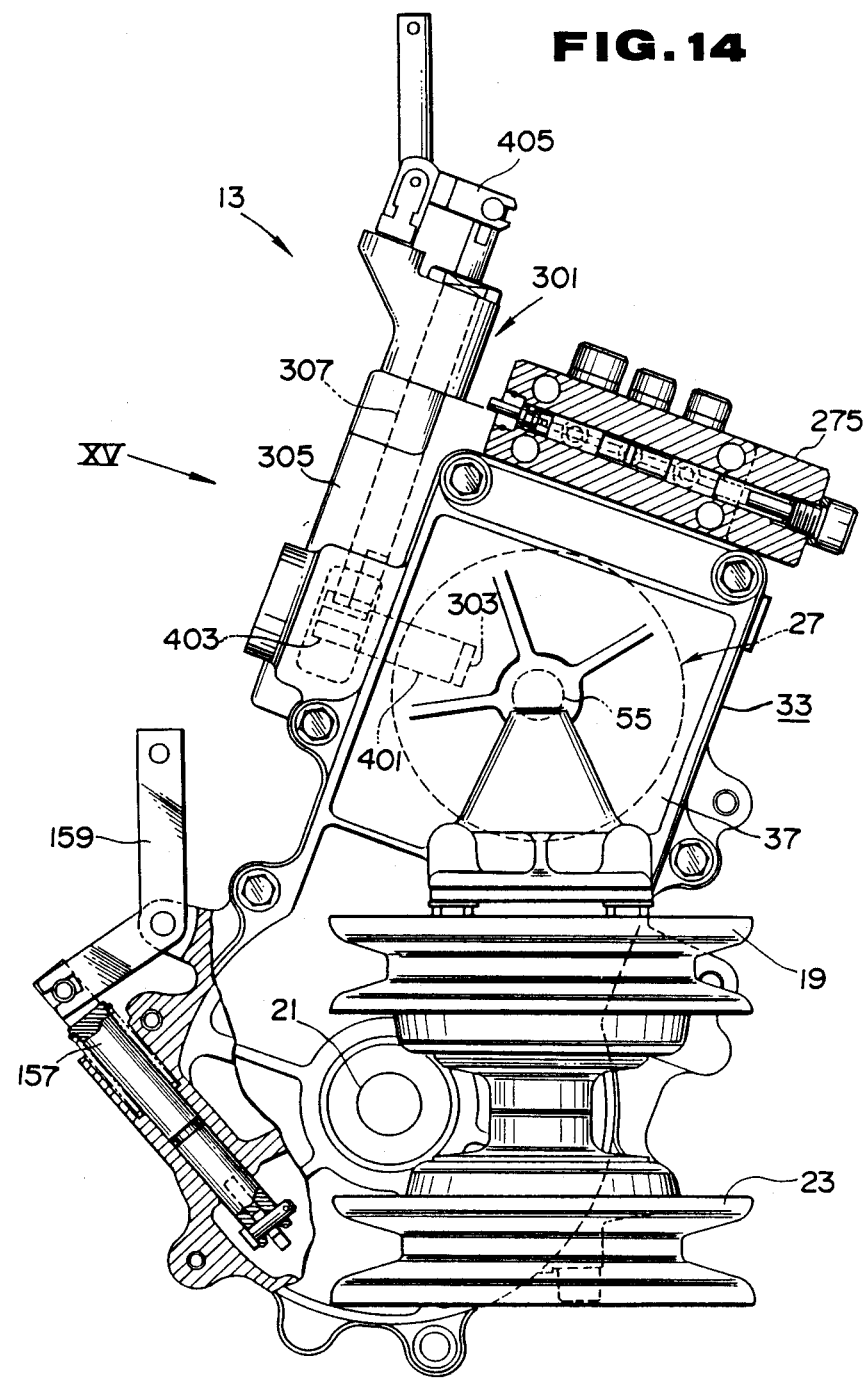
FIG. 14 is a lefthand side elevational view of a power transmission apparatus according to a fourth embodiment of the present invention.
Figure 15:
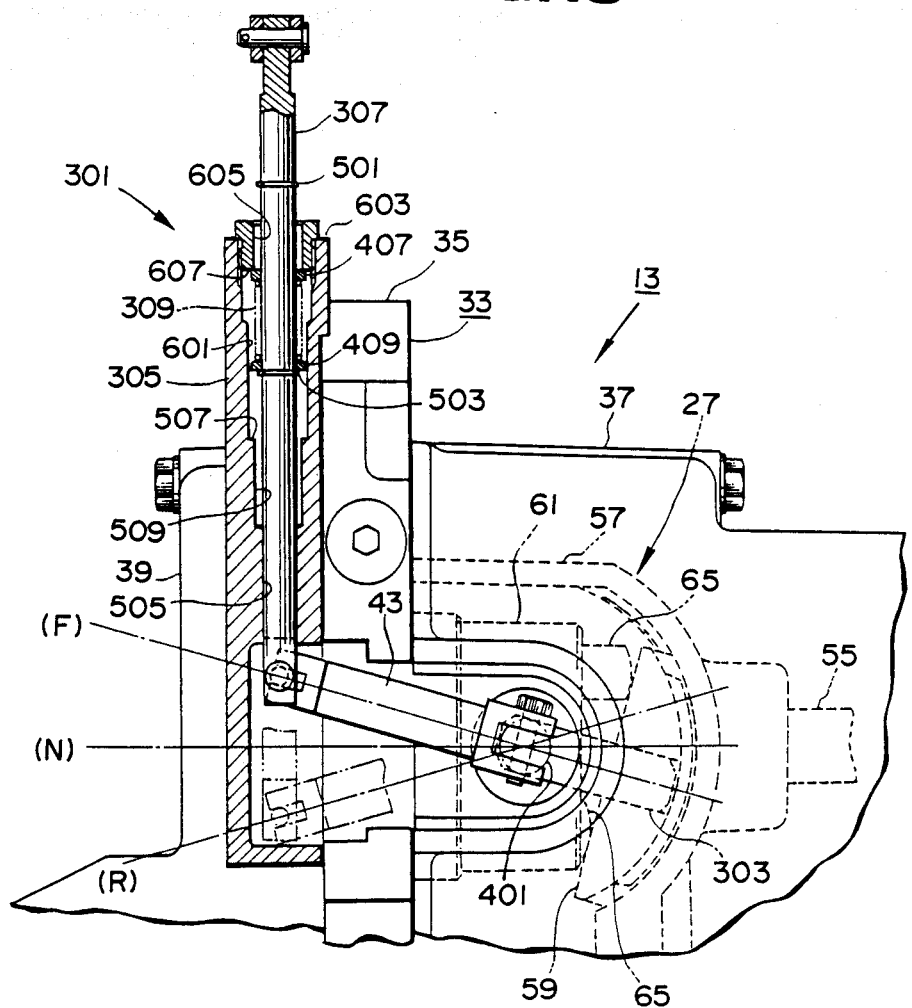
FIG. 15 is a fragmentary view, partly in cross section, of the power transmission apparatus as viewed in the direction of the arrow XV in FIG. 14.

A power transmission apparatus according to a fourth embodiment of the present invention will hereinafter be described with reference to FIGS. 14 and 15.

According to this embodiment, the transmission control mechanism 301 for varying the angle of inclination of the swash plate 59 of the oil pump 27 in the power transmission apparatus 13 according to the third embodiment is modified such that when the transmission control mechanism 301 is not operated, the power transmission apparatus 13 is automatically brought into the neutral position.

A transmission control mechanism 130 basically comprises an arm 303 disposed in the pump case 57 and engaging the swash plate 59, a case 305 attached to the base plate 35, a rod 307 axially movably disposed in the case 305, and a coil spring 309.

The arm 303 has a support shaft 401 projecting out of the pump case 57 and the lefthand outer case 37 through oil seals, and its projecting end is operatively coupled to the rod 307 by a link 403.

The rod 307 is operatively coupled to the shift lever near the steering wheel through an arm 405 and a cable (not shown). The coil spring 309 is disposed around the rod 307 and has opposite ends engageable with upper and lower annular seats 407, 409 loosely fitted over the rod 307. Upper and lower engaging members 501, 503 engageable with the upper and lower seats 407, 409, respectively, are fixed to the rod 307.

The distance between the upper and lower engaging members 501, 503 is selected such that the upper and lower engaging members 501, 503 engage the seats 407, 409, respectively, when the coil spring 309 is extended to its natural length in its free state.

The case 305 has defined therein a smaller-diameter hole 505 in which the rod 307 is slidably supported, an intermediate hole 509 of such a diameter that the lower engaging member 503 is allowed to move axially therein but the lower seat 409 engages an end face or step 507 at an end of the hole 509, and a larger-diameter hole 601 accommodating the upper and lower seats 407, 409 and the coil spring 309.

A cap 603 is threaded in the outer end of the larger-diameter hole 601, and the rod 307 is inserted through a hole 605 in the cap 603 into the holes 505, 509, 601.

The hole 605 in the cap 603 is of such a diameter that the upper engaging member 501 is axially movable therein, but the upper seat 407 engages an end face 607 of the cap 603. Therefore, the end face 507 of the intermediate hole 509 and the end face 607 of the cap 603 serve as engaging members for engaging the upper and lower seats 407, 409 on the opposite ends of the spring 309.

The distance between the end faces 507, 607 is selected such that they engage the seats 407, 409, respectively, when the coil spring 309 is extended to its natural length in its free state.

When no external forces are applied to the rod 307, the coil spring 309 is extended to its natural length under its own resiliency with its opposite ends engaging the seats 407, 409 which engage the end faces 507, 607. The link 403 and the arm 303 are now in the position N in FIG. 15, placing the transmission apparatus in the neutral position in which the pistons 65 are not reciprocally moved.

When the rod 307 is axially moved in a direction out of the case 305, the upper seat 407 engages the end face 607 and the coil spring 309 is compressed by the lower engaging member 503 and the lower seat 409. The link 403 and the arm 303 are brought into the position F, thus tilting the swash plate 59 in one direction to cause the pistons 65 to move reciprocally for thereby rotating the oil motors in the normal direction.

When the rod 307 is axially moved in a direction into the case 305, the lower seat 409 engages the end face 507 and the coil spring 309 is compressed by the upper engaging member 501 and the upper seat 407. The link 403 and the arm 303 are brought into the position R, thus tilting the swash plate 59 in the opposite direction to that described above to cause the pistons 65 to move reciprocally for thereby rotating the oil motors in the reverse direction.

According to this embodiment, by operating the shift lever, the rod 307 is axially moved to vary the angle of inclination of the swash plate 59 for selecting one of the forward, neutral, and reverse positions, and also the speed of travel of the lawn mower in the forward and reverse positions can be controlled. When the shift lever is released, the rod 307 is automatically returned to the neutral position under the bias of the coil spring 309. Therefore, the shifting operation of the power transmission apparatus is quite convenient to effect.

Figure 16:
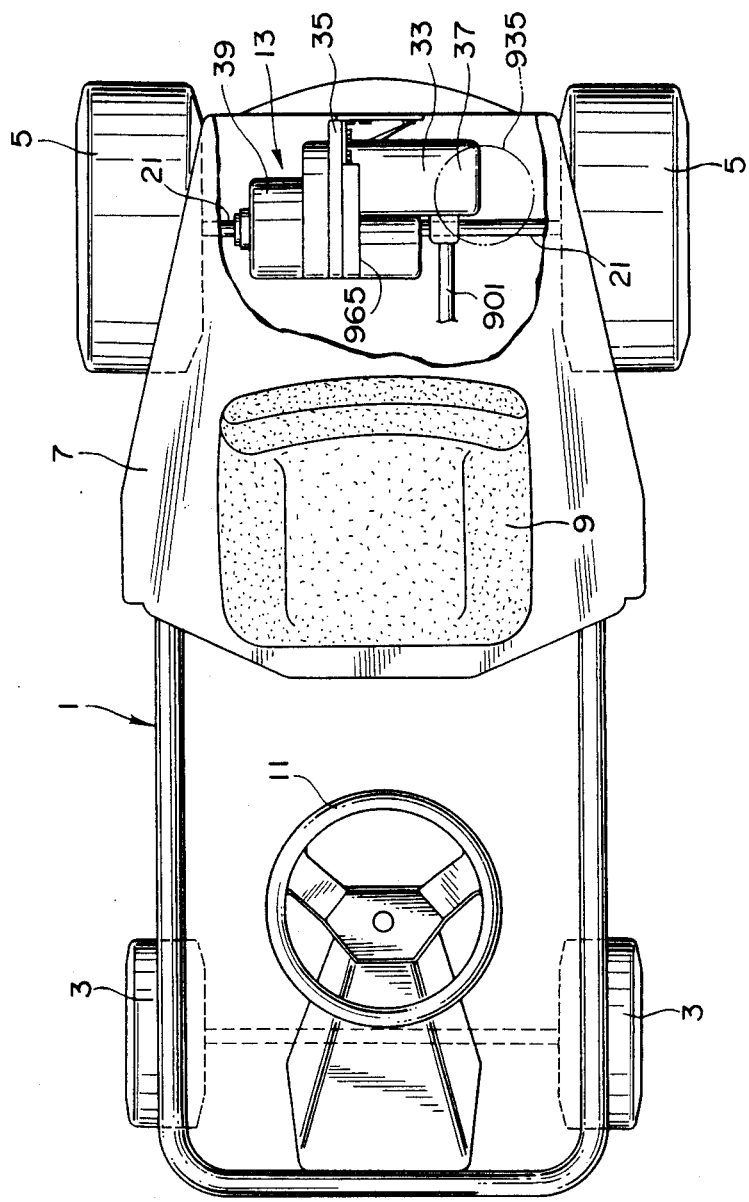
FIG. 16 is a plan view, partly cut away, of a riding-type lawn mower incorporating a power transmission apparatus according to a fifth embodiment of the present invention.
Figure 17:
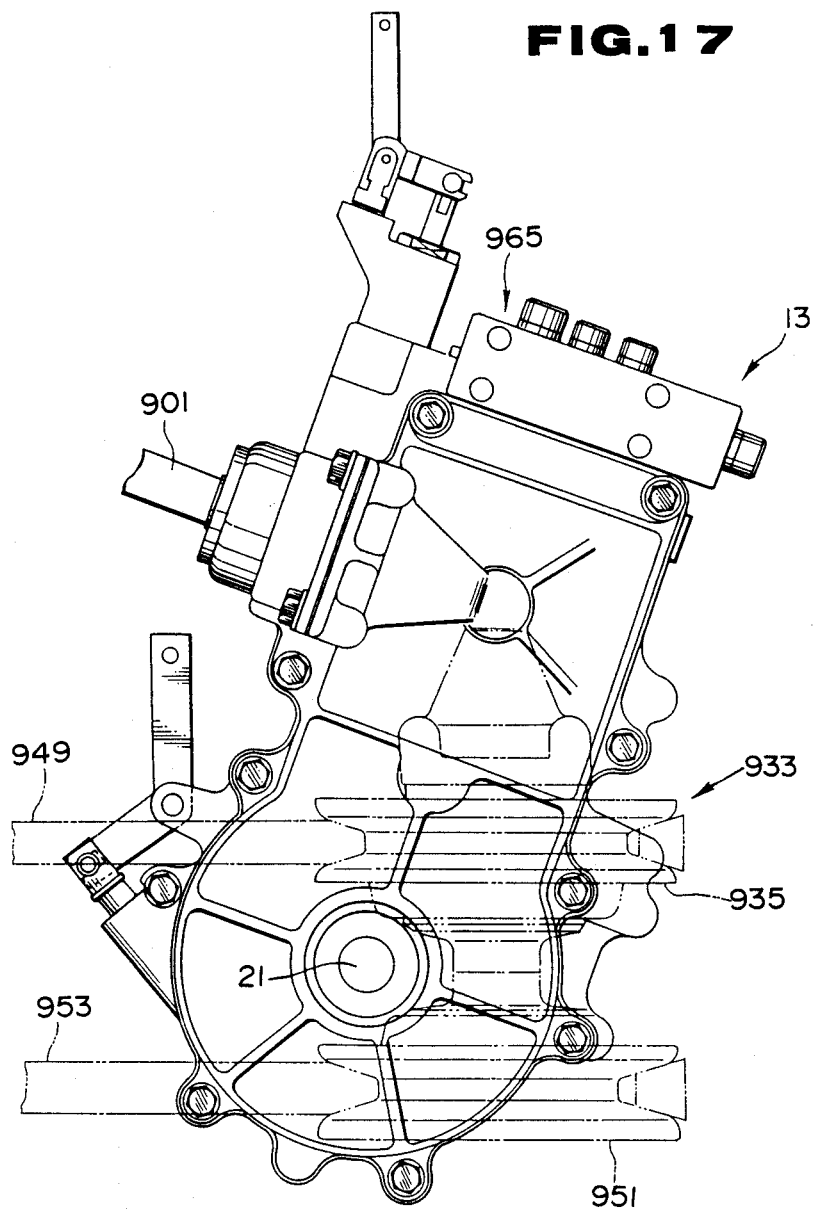
FIG. 17 is a side elevational view of the power transmission apparatus illustrated in FIG. 16.

FIGS. 16 through 18 illustrate a power transmission apparatus according to a fifth embodiment of the present invention.

As shown in FIGS. 16 and 17, part of the applied engine power is transmitted through a substantially longitudinal power transmission shaft 901 to a power transmission apparatus 13 from which modified power is applied to lefthand and righthand axles 21, whereas part of the applied engine power is transmitted to the grass cutter (not shown) disposed in the cutter housing 7 to rotate the grass cutter.

As illustrated in FIG. 18, the lefthand outer case 37 has on an upper portion thereof a casing portion 903 bulging leftwardly, and the transmission shaft 901 has a rear portion inserted into the transmission chamber 45 through an insertion section 907 on a front surface 905 of the casing portion 903, the insertion section 907 including a bearing hole 909. The rear portion of the transmission shaft 901 is supported by a bracket 911 and bearings 913. Denoted as 915 is an oil seal. The drive shaft 55 of the oil pump 27 has an extension 55A projecting out of the pump casing 57 toward a side wall 917 of the casing portion 903. The transmission shaft 901 and the extension 55A are operatively coupled to each other by meshing bevel gears 919, 921.

The extension 55A has a distal end supported by a bearing 924 in a bearing support 923 on the side wall 917.

The casing portion 903 has a lower surface 925 having an insertion section 927 which is closed in a fluid-tight manner by a lid 929. The insertion section 927 includes a bearing hole 931. As shown in FIGS. 17 and 18, the insertion section 927 is used to couple the engine to the extension 55A through a belt-and-pulley mechanism 933.

For alternatively transmitting the engine power to the extension 55A through the belt-and-pulley mechanism 993, a rotatable shaft 937 of a pulley 935 is inserted through the insertion section 927 into the transmission chamber 45 and supported by a bracket 939 and a bearing 941. A bevel gear 943 on the shaft 937 is held in mesh with a bevel gear 945 on the extension 55A. Since no shaft is required to be inserted through the insertion section 907 in this case, it may be closed off by a suitable lid (not shown). As shown in FIG. 17, the pulley 935 is disposed upwardly and rearwardly of the axles 21 and downwardly and laterally of the lefthand outer case 37. Denoted at 947 is an oil seal, 949 a belt for transmitting the engine power to the pulley 9035, and 951, 953 a pulley and a belt, respectively, for transmitting the engine power to the grass cutter.

In the embodiment shown in FIGS. 16 through 18, the engine and the drive shaft 55 of the oil pump 27 can be operatively interconnected by either the power transmission shaft 901 or the belt-and-pulley mechanism 933 by using the insertion section 907 or 927. Thus, the power transmission apparatus 13 can be easily adapted for use with different lawn mower or vehicle types.

With the present invention, as described above, the power transmission apparatus is unitized and made compact while ensuring better cooling of the oil pump and the oil motors, and any oil leakage is held to a minimum. The power transmission apparatus can be machined and assembled with high accuracy and ease, resulting in a cost reduction. Moreover, the oil pump and the oil motors are of increases durability, and prevented from entrapping air. The power transmission apparatus of the invention is easily adaptable for use with different vehicle types.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A power transmission apparatus for reducing the speed of rotation of an output from a power source and changing the speed of rotation thereof at a given transmission ratio, comprising:
    an oil pump having a drive shaft to which the power from the power source can be applied, said oil pump being drivable by the power from the power source;
    a pair of oil motors having output shafts, respectively, and associated with a pair of axles, respectively, said oil motors being drivable by hydraulic pressure generated by said oil pump;
    a pair of speed reducer mechanisms disposed between said output shafts of the oil motors and said axles for reducing the speeds of rotation of said output shafts, respectively, and transmitting the rotation of the output shafts to said axles, respectively;
    an inner case having a closed space defined therein, said oil pump and said oil motors being housed in said closed space;
    a transmission case having a transmission chamber defined therein, said inner case and said speed reducer mechanisms being housed in the transmission case, said transmission case storing oil therein;
    said drive shaft of the oil pump and said output shafts of the oil motors projecting from said inner case and being accommodated in said transmission chamber; and
    a base plate having flat opposite attachment surfaces;
    said oil pump and one of said oil motors being mounted on one of said attachment surfaces of said base plate and the other oil motor being mounted on the other attachment surface opposite to said one oil motor; and
    said drive shaft of the oil pump, said output shaft of the oil motors, and said axles lying parallel to each other.

2. A power transmission apparatus according to claim 1, wherein:
    said drive shaft of the oil pump extends parallel to said axles;
    said output shafts of said oil motors being disposed coaxially with each other; and
    at least one of said oil pump and each of said oil motors being of the variable-displacement type.

3. A power transmission apparatus according to claim 1, wherein:
    said inner case comprises two separate bodies mounted respectively on said attachment surfaces with said base plate interposed therebetween.

4. A power transmission apparatus according to claim 3, further including an oil charge pump for supplying oil to oil passages interconnecting said oil pump and said oil motors,
    said oil charge pump being mounted, together with said other oil motor, on said other attachment surface.

5. A power transmission apparatus according to claim 4, wherein said oil pump and said oil charge pump are disposed coaxially with each other.

6. A power transmission apparatus according to claim 4, wherein:
    said inner case has an oil reservoir,
    said base plate having oil passages defined therein and interconnecting said oil pump, said oil motors, and said oil charge pump, and interconnecting said oil charge pump and said oil reservoir.

7. A power transmission apparatus according to claim 1, wherein:
    said transmission case has two separate bodies attached respectively to said attachment surfaces,
    said oil pump and said oil motors being mounted on said attachment surfaces of the base plate.

8. A power transmission apparatus according to claim 1, wherein said inner case has a breather mechanism having a filter and providing communication between a closed space in said inner case and an area below or near a surface level of the oil stored in said transmission chamber.

9. A power transmission apparatus according to claim 8, wherein said transmission case has a breather mechanism venting a space above a surface level of the oil in the transmission chamber to atmosphere outside said transmission case.

10. A power transmission apparatus according to claim 1, further including an on/off valve for returning oil discharged from said oil pump,
    said on/off valve mounted on said base plate and comprising a case separate from said base plate and a valve body disposed in said case.

11. A power transmission apparatus according to claim 10, wherein said on/off valve is mounted on said base plate near said oil motors.

12. A power transmission apparatus according to claim 10, wherein said on/off valve is mounted on said base plate outside of said transmission case.

13. A power transmission apparatus for a vehicle for reducing the speed of rotation of an output from a power source, changing the speed of rotation thereof at a given transmission ratio, and transmitting the power to at least one axle of the vehicle, comprising:
    an oil pump having a drive shaft to which the power from the power source can be applied, said oil pump being drivable by the power from the power source;
    at least one oil motor having an output shaft and associated with said axle, said oil motor being drivable by hydraulic pressure generated by said oil pump;
    at least one speed reducer mechanism disposed between said output shaft of said oil motor and said axle for reducing the speed of rotation of said output shaft and transmitting the rotation of the output shaft to said axle;
    a base plate having at least one flat attachment surface;
    an inner case mounted on said attachment surface of the base plate and housing said oil pump and said oil motor;
    transmission case mounted on said base plate and housing said inner case and said speed reducer mechanism;
    said drive shaft of the oil pump having an extension projecting from said inner case toward a confronting inner surface of said transmission case; and
    said transmission case having, near said extension of the drive shaft, an insertion section for inserting a power transmission shaft adapted to coupled said extension to said power source into said transmission case, and another insertion section for inserting a rotatable shaft of a belt-and-pulley mechanism adapted to couple said extension to said power source into said transmission case, and also having a lid closing one of said insertion sections.

14. A power transmission apparatus for reducing the speed of rotation of an output from a power source and changing the speed of rotation thereof at a given transmission ratio, comprising:
- an input shaft to which the power from the power source can be applied;
- an oil pump having a drive shaft and being drivable by the input shaft;
- a first speed reducer mechanism disposed between said input shaft and said drive shaft of said oil pump for reducing the speed of rotation of said input shaft and transmitting the rotation of said input shaft to said drive shaft;
- an oil motor having an output shaft and associated with an axle, said oil motor being drivable by hydraulic pressure generated by said oil pump;
- a base plate having oil passages defined therein, said oil pump and said oil motor being attached to said base plate;
- a second speed reducer mechanism disposed between said output shaft of the oil motor and said axle, and transmitting the rotation of the output shaft to said axle;
- a transmission case having a transmission chamber defined therein, said transmission case being attached to said base plate, said oil pump and said oil motor being housed in the transmission case, storing oil therein, and said first and second speed reducer mechanisms being disposed in the vicinity of said transmission case; and
- an inner case having a closed space defined therein, said oil pump and said oil motor being housed in said closed space; and
- said inner case, said gear train and said speed reducer mechanism being housed in said transmission case.

15. A power transmission apparatus for reducing the speed of rotation of an output from a power source and changing the speed of rotation thereof at a given transmission ratio, comprising:
- an input shaft to which the power from the power source can be applied;
- an oil pump having a drive shaft and being drivable by the input shaft;
- a first speed reducer mechanism disposed between said input shaft and said drive shaft of said oil pump for reducing the speed of rotation of said input shaft and transmitting the rotation of said input shaft to said drive shaft;
- an oil motor having an output shaft and associated with an axle, said oil motor being drivable by hydraulic pressure generated by said oil pump;
- a base plate having oil passages defined therein, said oil pump and said oil motor being attached to said base plate;
- a second speed reducer mechanism disposed between said output shaft of the oil motor and said axle, and transmitting the rotation of the output shaft to said axle;
- a transmission case having a transmission chamber defined therein, said transmission case being attached to said base plate, said oil pump and said oil motor being housed in the transmission case, storing oil therein, and said first and second speed reducer mechanisms being disposed in the vicinity of said transmission case; and
- one end of said drive shaft being rotatably supported by said base plate and another end of said drive shaft being rotatably supported by said transmission case.

16. A power transmission apparatus for reducing the speed of rotation of an output from a power source and changing the speed of rotation thereof at a given transmission ratio, comprising:
- an input shaft to which the power from the power source can be applied;
- an oil pump having a drive shaft and being drivable by the input shaft;
- a first speed reducer mechanism disposed between said input shaft and said drive shaft of said oil pump for reducing the speed of rotation of said input shaft and transmitting the rotation of said input shaft to said drive shaft;
- an oil motor having an output shaft and associated with an axle, said oil motor being drivable by hydraulic pressure generated by said oil pump;
- a base plate having oil passages defined therein, said oil pump and said oil motor being attached to said base plate;
- a second speed reducer mechanism disposed between said output shaft of the oil motor and said axle, and transmitting the rotation of the output shaft to said axle;
- a transmission case having a transmission chamber defined therein, said transmission case being attached to said base plate, said oil pump and said oil motor being housed in the transmission case, storing oil therein, and said first and second speed reducer mechanisms being disposed in the vicinity of said transmission case; and
- said oil pump, said oil motor and said transmission case being mounted on the same attachment surface of said base plate.

17. A power transmission apparatus for reducing the speed of rotation of an output from a power source and changing the speed of rotation thereof at a given transmission ratio, comprising:
- an oil pump having a drive shaft to which the power from the power source can be applied and disposed parallel to a pair of axles, said oil pump being drivable by the power from the power source;
- a pair of oil motors having output shafts, respectively, and associated with said pair of axles, respectively, said oil motors being drivable by hydraulic pressure generated by said oil pump, said output shafts of the oil motors being disposed coaxially with each other and parallel to said axles;
- a pair of speed reducer mechanisms disposed between said output shafts of the oil motors and said axles for reducing the speed of rotation of said output shafts, respectively, and transmitting the rotation of said output shafts to said axles, respectively; and
- a base plate having attachment surfaces;
- said oil pump and one of said oil motors being mounted on one of said attachment surfaces, the other oil motor being mounted on the other attachment surface opposite to said one oil motor.

18. A power transmission apparatus for reducing the speed of rotation of an output from a power source and changing the speed of rotation thereof at a given transmission ratio, comprising:
- an input shaft to which the power from the power source can be applied, said input shaft being disposed substantially vertically;

an oil pump having a drive shaft disposed over a pair of axles and perpendicular to said input shaft;

a gear train interconnecting said input shaft and said drive shaft and transmitting the rotation of said input shaft to said drive shaft;

at least one oil motor having an output shaft and associated with said axles, said oil motor being drivable by hydraulic pressure generated by said oil pump; and a transmission case having a transmission chamber defined therein, said oil pump, said oil motor and said gear train being housed in said transmission case, storing oil therein;

said output shaft of the oil motor being disposed between and parallel to said drive shaft and said axles, and said input shaft being disposed perpendicular to said axles.

19. A power transmission apparatus according to claim 18, wherein:

a lower end of said input shaft is positioned over a lower end of said transmission case.

20. A power transmission apparatus for reducing the speed of rotation of an output from a power source and changing the speed of rotation thereof at a given transmission ratio, comprising:

an oil pump drivable by the power from said power source;

a pair of oil motors having output shafts, respectively, and associated with a pair of axles, respectively, said oil motors being drivable by hydraulic pressure generated by said oil pump;

at least one of said oil pump and said oil motors being of a variable-displacement type;

a base plate having flat, opposite attachment surfaces; and a transmission case having a transmission chamber defined therein, said oil pump and said oil motors being housed in said transmission case, storing oil therein;

said transmission case including two separate bodies mounted respectively one said base plate, said oil pump and one of said oil motors being mounted on one of said attachment surfaces, and the other oil motor being mounted on the other attachment surface opposite to the one oil motor.

21. A power transmission apparatus according to claim 20, further comprising:

a pair of speed reducer mechanisms disposed between said pair of oil motors and said axles for reducing the speed of rotation of said output shafts, respectively, and transmitting the rotation of the output shafts to said axles, respectively.

22. A power transmission apparatus according to claim 20, further comprising:

a pair of brakes disposed on said axles, respectively, in said transmission chamber.

23. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatable supported by said base plate and projecting from said transmission case; and an inner case provided in said transmission chamber for housing said oil pump and said oil motor in a closed space defined in the inner case, said drive shaft of the oil pump and said output shaft of the oil motor projecting from said inner case and being accommodated in the transmission chamber.

24. A power transmission apparatus according to claim 23, wherein said inner case comprises two separate bodies mounted respectively on said opposite attachment surfaces with said base plate interposed therebetween.

25. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case; and a pair of oil motors having respective output shafts disposed coaxially with each other and parallel to each said axle, said drive shaft of the oil pump extending parallel to said axle, and at least one of said oil pump and each said oil motor being of a variable-displacement type.

26. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case; and a pair of oil motors, said oil pump and one of said oil motors being mounted on one of said attachment surfaces of said base plate, the other oil motor being mounted on the other attachment surface opposite to said one oil motor, and said drive shaft of the oil pump, said output shafts of the oil motors, and each said axle lying parallel to each other.

27. A power transmission apparatus according to claim 26, including an on/off valve for returning oil discharged from said oil pump, said on/off valve is mounted on said base plate and comprises a case separate from said base plate and a valve body disposed in said case.

28. A power transmission apparatus according to claim 27, wherein said on/off valve is mounted on said base plate near said oil motors.

29. A power transmission apparatus according to claim 27, wherein said on/off valve is mounted on said base plate outside of said transmission case.

30. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case; and a pair of oil motors and an oil charge pump for supplying oil to oil passages interconnecting said oil pump and said oil motors;

said oil pump and one of said oil motors being mounted on one of said opposite attachment surfaces of said base plate, and said oil charge pump and the other oil motor being mounted on the other attachment surface.

31. A power transmission apparatus according to claim 30, wherein said one oil motor is disposed opposite to said other oil motor, and said oil pump and said oil charge pump are disposed coaxially with each other.

32. A power transmission apparatus according to claim 30, including an inner case having a closed space defined therein and having an oil reservoir, said oil pump, said oil motors and said oil charge pump being housed in said closed space; and said base plate having oil passages defined therein and interconnecting said oil pumps, said oil motors, and said oil charge pump, and interconnecting said oil charge pump and said oil reservoir.

33. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case; and an inner case having a closed space defined therein, said oil pump and each said oil motor being housed in said closed space; and said inner case having a breather mechanism with a filter and providing communication between said closed space in said inner case and an area below or near a surface level of the oil stored in said transmission chamber.

34. A power transmission apparatus according to claim 33, wherein said transmission case has a breather mechanism venting a space above the surface level of the oil in the transmission chamber to atmosphere outside said transmission case.

35. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case;

an output shaft being provided for receiving the power from the power source and an additional speed reducer mechanism being disposed between said input shaft and said drive shaft of the oil pump for reducing the speed of rotation of said input shaft and transmitting the rotation of said input shaft to said drive shaft; and an inner case being provided in said transmission chamber for housing said oil pump and said oil motor in a closed space defined in the inner case.

36. A power transmission apparatus according to claim 35, wherein said inner case comprises two separate bodies mounted respectively on said opposite attachment surfaces of said base plate with said base plate interposed therebetween.

37. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case;

an input shaft being provided for receiving the power from the power source and an additional speed reducer mechanism being disposed between said input shaft and said drive shaft of the oil pump for reducing the speed of rotation of said input shaft and transmitting the rotation of said input shaft to said drive shaft; and a pair of oil motors having respective output shafts disposed coaxially with each other and parallel to a pair of axles associated therewith, said drive shaft of the oil pump extending parallel to said axles, and at least one of said oil pump and said oil motors being of a variable-displacement type.

38. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one oil motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having at transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case;

an input shaft being provided for receiving the power from the power source and an additional speed reducer mechanism being disposed between said input shaft and said drive shaft of the oil pump for reducing the speed of rotation of said input shaft and transmitting the rotation of said input shaft to said drive shaft; and a pair of oil motors associated with a pair of axles, said oil pump and one of said oil motors being mounted on one of said attachment surfaces of said base plate, the other oil motor being mounted on the other attachment surface opposite to said one oil motor, and said drive shaft of the oil pump, said output shafts of the oil motors and said axles lying parallel to each other.

39. A power transmission apparatus for reducing the speed of rotation of an output from a power source and changing the speed of rotation thereof at a given transmission ratio, comprising:

an oil pump having a drive shaft to which power from the power source can be applied, said oil pump being drivable by the power from the power source;

at least one motor, said oil motor having an output shaft and associated with an axle, and said oil motor being drivable by hydraulic pressure generated by said oil pump;

at least one speed reducer mechanism disposed between said output shaft of the oil motor and said axle for reducing the speed of rotation of the output shaft and transmitting the rotation of the output shaft to said axle;

a transmission case having a transmission chamber defined therein for housing said oil pump, said oil motor and said speed reducer mechanism, the transmission chamber storing oil therein;

a single base plate having opposite attachment surfaces and oil passages defined therein;

said oil pump, said oil motor and said transmission case being attached to said base plate, said axle being rotatably supported by said base plate and projecting from said transmission case;

an input shaft being provided for receiving the power from the power source and an additional speed reducer mechanism being disposed between said input shaft and said drive shaft of the oil pump for reducing the speed of rotation of said input shaft and transmitting the rotation of said input shaft to said drive shaft;

said input shaft being disposed substantially vertically;

said drive shaft being disposed over a pair of axles and perpendicular to said input shaft; and said output shaft of the oil motor being disposed between and parallel to said drive shaft and said axles, whereby said input shaft is disposed perpendicular to said axles.

40. A power transmission apparatus according to claim 39, wherein a lower end of said input shaft is positioned over a lower end of said transmission case.

* * * * *

UNITED STATES PATENT AND TRADEMARK OFFICE
CERTIFICATE OF CORRECTION

PATENT NO. : 4,974,472

DATED : December 4, 1990

INVENTOR(S) : NISHIMURA et al.

It is certified that error appears in the above-identified patent and that said Letters Patent is hereby corrected as shown below:

Title Page, located in the Foreign Application Priority Data, change "Feb. 13, 1988" to --Feb. 13, 1987--.

Column 1, line 17, change "apparati" to --apparatus--;
        line 28, delete "coupling" and insert --comprising-- in its place.

Column 3, line 68, change "respectively,," to --respectively,--.

Column 10, line 42, change "301" to --701--;
        line 46, change "301" to --701--;
        line 49, change "130" to --301--.

Column 12, line 30, change "993" to --933--;
        line 41, change "9035" to --935--;
        line 58, change "increases" to --increased--.

Column 14, line 57 (Claim 13, line 24), before "transmission" insert --a--;
        line 65 (Claim 13, line 32), change "coupled" to --couple--.

Column 17, line 41 (Claim 20, line 20), change "one" to --on--.

Column 18, line 14 (Claim 23, line 26), change "rotatable" to --rotatably--.

Column 19, line 1 (Claim 26, line 9), after "said" insert --oil--.

Column 21, line 18 (Claim 35, line 28), change "output" to --input--.

UNITED STATES PATENT AND TRADEMARK OFFICE
CERTIFICATE OF CORRECTION

PATENT NO.   : 4,972,472
DATED        : December 4, 1990
INVENTOR(S)  : Sadanori Nishimura, et al.

It is certified that error appears in the above-identified patent and that said Letters Patent is hereby corrected as shown below:

Column 21, line 18 (Claim 35 ), change "output" to --input--.

Signed and Sealed this

Twenty-sixth Day of May, 1992

Attest:

DOUGLAS B. COMER

*Attesting Officer*        *Acting Commissioner of Patents and Trademarks*